Dec. 9, 1930. W. REBIKOFF 1,784,159
DOUBLE CONTROL DEVICE FOR PHONOGRAPHS
Filed May 10, 1929
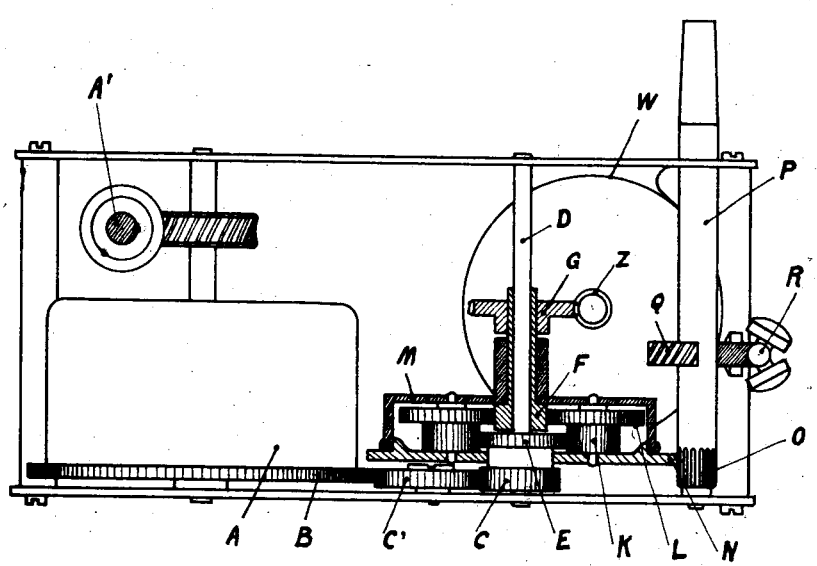

Patented Dec. 9, 1930

1,784,159

UNITED STATES PATENT OFFICE

WASSILY REBIKOFF, OF PARIS, FRANCE, ASSIGNOR TO LEONIDE DAVYDOFF, OF PARIS, FRANCE

DOUBLE-CONTROL DEVICE FOR PHONOGRAPHS

Application filed May 10, 1929, Serial No. 362,009, and in Germany August 11, 1928.

Driving devices for phonographs are known comprising two motors, say a spring and an electric motor, each motor being adapted to be connected in turn with the turntable shaft through controlled clutches or through automatic couplings of the free wheel type.

Thus the phonograph may be driven either by winding up by hand the spring of the first motor, connecting said motor with the turntable shaft and then allowing the spring motor to start working, the other motor being disconnected or else electrically by connecting the electric motor with the shaft and feeding it with electric current, the spring motor being disconnected. The phonograph may thus be driven under all circumstances.

But such arrangements are complicated and costly. I have already proposed the suppression of any clutches or couplings by connecting permanently the spring and the electric motor with the turntable shaft through a differential gear always in mesh with the motors and with the shaft. A suitable control device allows the spring motor to be started and the current to be switched off simultaneously or to close the circuit over the electric motor and to stop simultaneously the spring motor by means of a catch. The two motors work thus in alternation. This arrangement has the advantage of allowing both motors to be permanently in connection with the turntable shaft through a positive control mechanism. As this control mechanism is a differential gear, the shaft is controlled when one of the motors is inoperative only through the other motor which works as if the former one did not exist. The parts of the differential gear directly driven by the operative motor control the planet pinions which bear against those parts of the gear which are held stationary through their direct connection with the inoperative motor, the planet pinions may thereby drive in their turn the turntable shaft.

My invention has for its object an improved device of this type wherein the winding up of the spring motor is provided automatically by the other motor, which is for instance an electric motor; the spring motor which is thus always under tension whilst the other motor is operative, starts automatically whenever the speed of the said other motor decreases (for instance on the case of an electric motor through a decrease in the feed voltage) so as to keep the speed of the turn-table shaft constant. When the spring motor is alone operative the second motor is stopped. In the arrangement disclosed hereinbelow no control device is required for stopping the spring motor when the electric motor is switched in and for cutting off the electric motor when the spring motor is started.

My improved control device comprises thus a spring motor, a second motor, say an electric motor and a differential mechanism controlled simultaneously by each of the two motors whilst the second motor is operative and controlling the turn-table shaft, means being provided for preventing the differential mechanism from driving the second motor when controlled by the spring motor. For instance a non-reversible connection may be provided between the shaft of the second motor and the differential mechanism.

I have described hereinbelow by way of example and shown diagrammatically on appended drawing a side view of a form of execution of my invention.

The turntable shaft P controlling in the usual manner a centrifugal regulator R through a worm wheel Q is controlled by an electric motor W of suitable power and by a spring motor A.

The differential mechanism which provides the connection comprises a central shaft D mounted between the two plates of the device and provided at its lower end with a pinion C meshing with a pinion C' engaging in its turn the toothed wheel B of the drum of the spring motor A. A hollow spindle H loosely mounted over the central shaft D is provided with a worm wheel G in mesh with the worm Z carried by the end of the shaft of the electric motor W so as to provide a nonreversible connection between the controlling motor and the controlled shaft D. This latter shaft carries a pinion E whereas the spindle H carries a pinion F the diameter of which is different from that of pinion E. Planet pinions showing two tooth-works K, L of different diameter are mounted on spindles secured to a casing M rotatably mounted on the spindle H. The toothwork K of one planet pinion meshes with the pinion E driven by the spring motor whereas the toothwork L of the other planet pinion meshes with the pinion F driven by the electric motor. The casing M is provided with an outer toothwork N meshing with a toothwork O provided on the turntable shaft P.

The spring motor may be wound up through a shaft A' acting through a worm on a worm-wheel provided on the motor shaft.

The working of the device is as follows: When the electric motor is started the differential mechanism actuates on one hand through the toothed wheel N the shaft and on the other through the pinion C it winds up the spring motor A which is supposed to be unwound at the time. The shaft P and the tooth-work B rotate with speeds which are in a reverse ratio to the resistance offered by them. As the tension of the spring increases, the speed of the electric motor decreases. After a certain time, the spring of the motor A is wound up to its normal operative tension which is about 80% of its maximum tension. The spring remains then at this tension, the shaft P always rotating at normal speed due to the action of the regulator R.

If the speed of the electric motor W were to vary for any reason whatever, for instance due to variations in the feed current, there is an automatic regularization of the speed of the shaft P. If the electric motor commences to rotate less rapidly, it exerts a lesser strain on the spring motor and the spring may therefore unwind and actuate the differential mechanism. The shaft P receives thus the added speeds due to both motors, the complementary speed received from the spring motor compensating exactly the diminution of speed due to the falling off of the electric motor. On the contrary if the speed of the electric motor were to increase, the complementary power transmitted thereby to the differential mechanism would be absorbed by the spring of the motor A the tension of which would be increased and by the rubbing between the friction pad and the disc of the regulator R without any substantial modification in the speed of the shaft P. The spring of the motor A acts on the transmission between the electric motor and the turntable shaft so as to damp the effect on the latter of the speed modifications of the motor W. Its action is somewhat similar to that of a dash-pot connected with a water pipe for regulating its flow; the action of the spring is combined with that of the regulator R for giving the record a perfectly uniform speed.

If it is desired to control the phonograph through the spring motor A, it is sufficient to wind the latter up through a crank acting on the shaft A'. The electric motor W which is not fed, is not driven by the differential mechanism because the connection between G and Z is not reversible owing to the pitch chosen for the worm Z. The entire power of the motor A serves for driving the turn-table shaft in this case.

As may be readily seen, my improved device retains all the advantages of the usual two motor control devices and of my own above disclosed prior differential control mechanism whilst showing moreover a perfect automaticity of regulation when electrically controlled.

What I claim is:

1. Double control device for phonographs comprising a spring motor, a second motor, a differential mechanism controlled simultaneously by both motors when the second motor is operative, a turn-table shaft controlled by said mechanism and means adapted to prevent the reverse actuation of the second motor by the differential mechanism.

2. Double control device for phonographs comprising a spring motor, an electric motor, a differential mechanism controlled simultaneously by both motors when the electric motor is operative, a turn-table shaft controlled by said mechanism and means adapted to prevent the reverse actuation of the electric motor by the differential mechanism.

3. Double control device for phonographs comprising a spring motor, an electric motor, a differential mechanism, a turntable shaft controlled by said mechanism, non-reversible means for permanently and operatively connecting the electric motor and the differential mechanism and reversible means for permanently and operatively connecting the spring motor and the differential mechanism.

4. Double control device for phonographs comprising a spring motor, an electric motor, a turntable shaft, an intermediary shaft, a toothed wheel keyed thereto and controlled by the spring motor, a spindle concentric with the intermediary shaft, a worm gear connecting said spindle with the electric motor, two pinions of different sizes keyed respectively to the intermediary shaft and to the spindle, a loosely mounted casing concentric with the intermediary shaft and spindle, a tooth work on said casing adapted to control the turntable shaft and planet pinions fitted in said casing and provided with two toothworks of different diameters meshing respectively with the pinions on the intermediary shaft and on the spindle concentric therewith.

In testimony whereof I have affixed my signature.

WASSILY REBIKOFF.